Dec. 14, 1965  C. R. WARD  3,223,510
APPARATUS FOR DRAWING SHEET GLASS
Original Filed Nov. 2, 1959  5 Sheets-Sheet 1

INVENTOR.
CECIL R. WARD
BY
Oscar H. Spencer
ATTORNEY

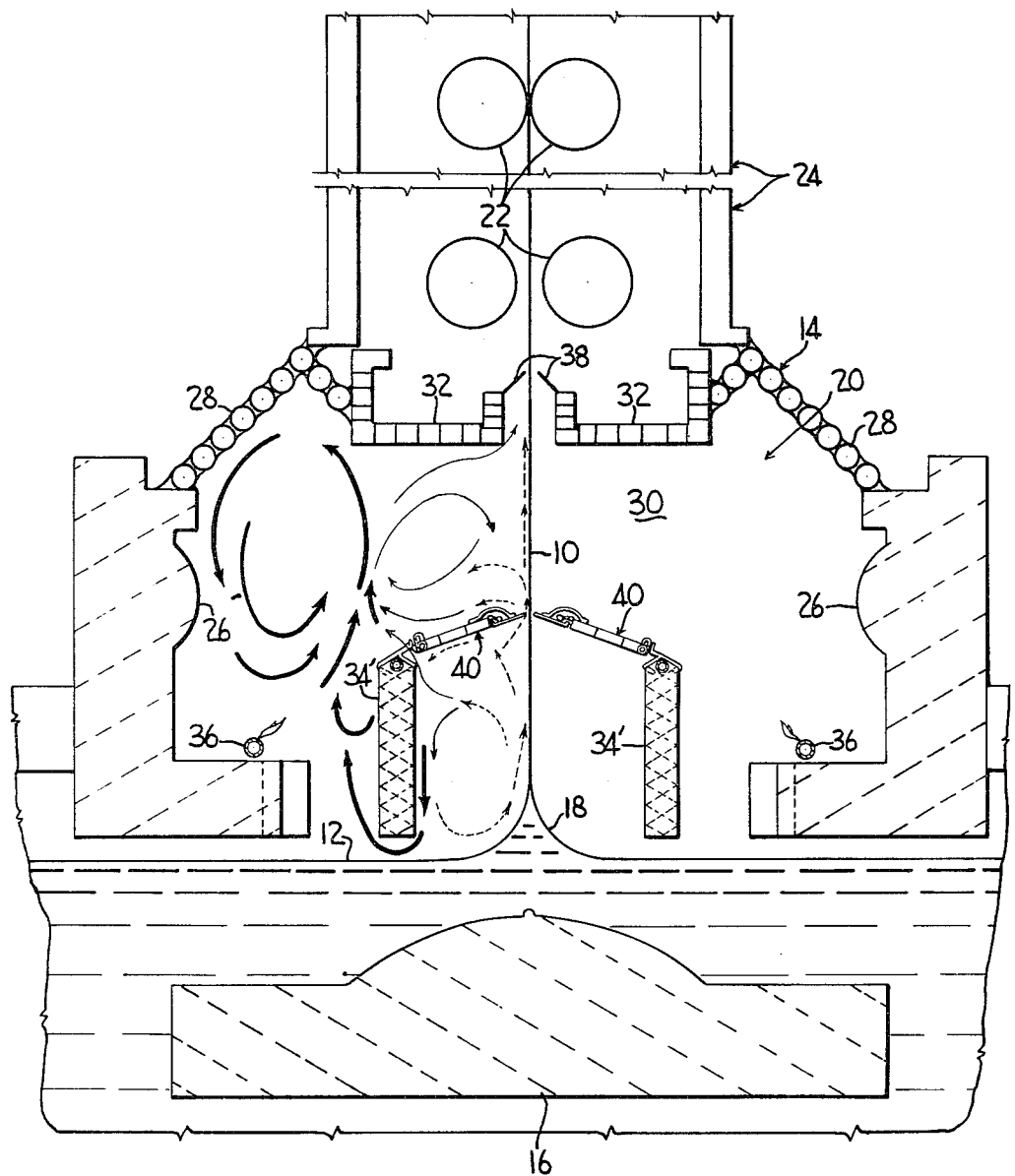

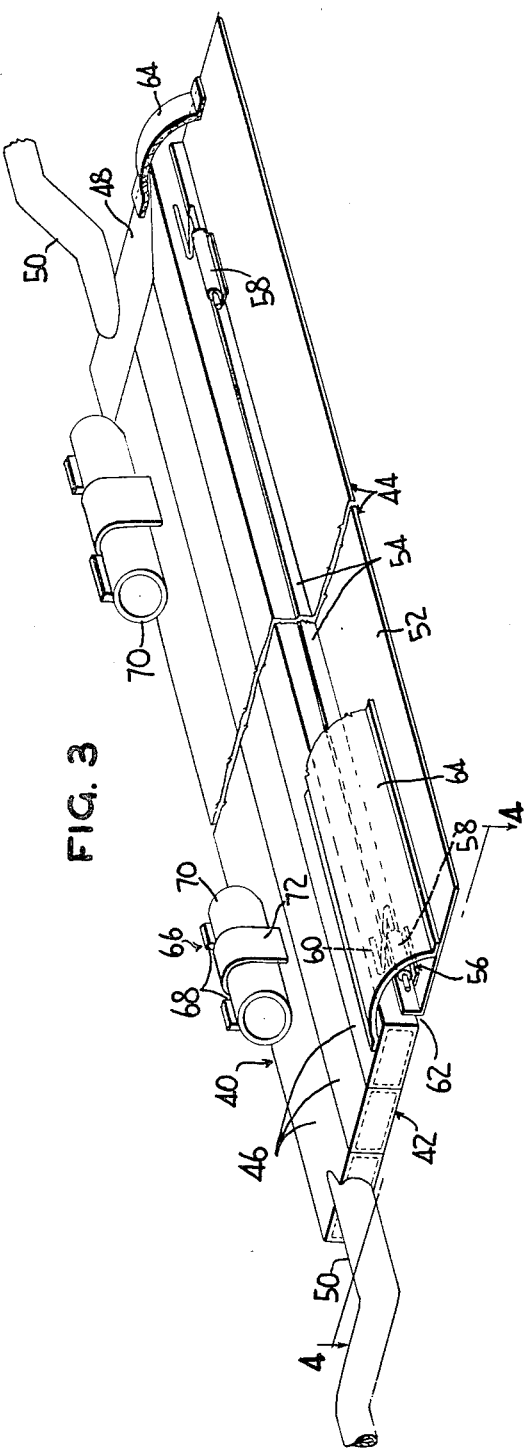
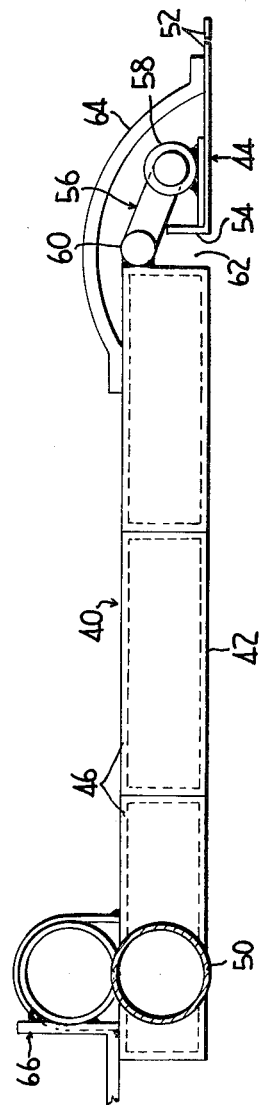

Dec. 14, 1965

C. R. WARD 3,223,510

APPARATUS FOR DRAWING SHEET GLASS

Original Filed Nov. 2, 1959

INVENTOR.
CECIL R. WARD
BY
Oscar L. Spencer
ATTORNEY

Dec. 14, 1965    C. R. WARD    3,223,510
APPARATUS FOR DRAWING SHEET GLASS
Original Filed Nov. 2, 1959    5 Sheets-Sheet 5
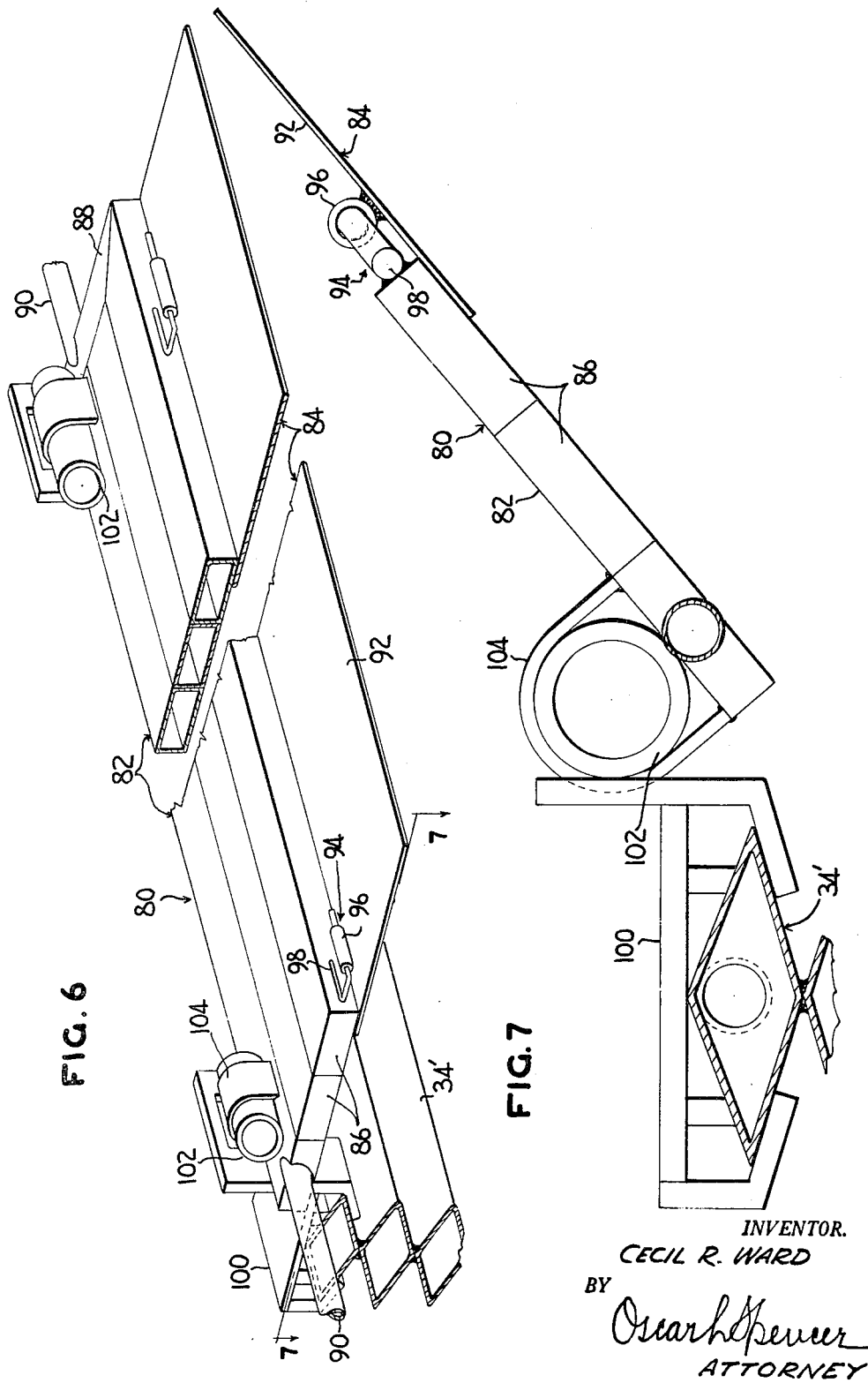
INVENTOR.
CECIL R. WARD
BY
Oscar L. Spencer
ATTORNEY United States Patent Office 3,223,510
Patented Dec. 14, 1965

3,223,510
APPARATUS FOR DRAWING SHEET GLASS
Cecil R. Ward, Gibsonia, Pa., assignor to Pittsburgh Plate Glass Company, Pittsburgh, Pa., a corporation of Pennsylvania
Continuation of application Ser. No. 850,122, Nov. 2, 1959. This application Feb. 12, 1963, Ser. No. 260,094
5 Claims. (Cl. 65—203)

This application is a continuation of my application Serial No. 850,122, filed November 2, 1959, now abandoned, and entitled "Apparatus for Drawing Glass Sheet."

This invention relates to the manufacture of sheet glass by continuous drawing from a bath of molten glass and provides improved methods and apparatus for producing drawn sheet glass of improved appearance wherein the usual characteristic wave pattern, i.e., transverse thickness variations which appear as bands or ribs, extending generally in the direction of the draw, is eliminated or materially reduced.

These characteristic wave patterns occur primarily because of non-uniform cooling of the sheet across its width. To provide uniform cooling of the sheet, it is desirable to allow the heat loss to take place substantially entirely by radiation rather than by a transfer to convection currents or a combination of radiation and a transfer to convection currents.

In conventional process of drawing sheet glass, a natural stack is induced by the geometry of the sheet, bath and drawing chamber wherein there is a transfer of heat from the bath and sheet at relatively elevated temperatures to the cooler ambient air within the chamber producing a convection flow of air in the direction of the draw and out of the chamber. The movement of heated air in the direction of the draw results in zones of reduced pressure at the base or meniscus of the sheet, so that colder air is drawn to the reduced pressure zones. Air enters the drawing chamber at the juncture of the chamber and the drawing machine and leaks into the chamber from cracks, crevices, or the like in the chamber walls. Colder air flowing to the zones of low pressure is chilled by moving generally across coolers, which are disposed within the chamber slightly above the surface of the bath and on opposite sides of the sheet to accelerate the setting of the glass. As readily understood, the temperature of entering air will be non-uniform because of differences in temperature of the sources of this air and this condition will persist due to differences in paths taken by this air in the drawing chamber, and, also, due to conditions within the kiln. These temperature differences cause non-uniform velocities within the drawing chamber. The colder air of non-uniform velocities flows to the reduced pressure zones and disturbs the relatively thin surface adhering film moving with the glass causing non-uniform heat transfer across the sheet, thereby affecting the formation of the glass in the area where the glass undergoes the transition from fluid to solid state. Being in the plastic state and under stress, the glass is unequally attenuated to form a characteristic wave pattern.

Another characteristic wave pattern extends diagonally and usually exists on the outer margins of the sheet. This diagonal wave pattern may be so severe, in some instances, as to extend entirely across the sheet. The diagonal wave pattern, when superimposed on a longitudinal wave pattern provides a pattern referred to in the sheet glass industry as "batter" or "dapple," and is the result of colder air flowing from the vicinity of the ends of the coolers and the ends of the drawing chamber to the zones of low pressure at the base of the sheet. These currents of air are commonly referred to as "end-around currents."

Many arrangements have been proposed to improve the appearance of drawn sheet glass. One such arrangement is taught by Brichard in United States Patent No. 2,693,052, wherein burners or suction means are disposed just above the surface of the bath to eliminate flow of relatively cold air to the base of the glass sheet in the direction of the draw. Thus, either no air flow takes place along the sheet or else such air flow as takes place moves along the sheet in a direction opposite to that of the draw.

Other arrangements to improve the appearance of drawn sheet glass have been proposed in the application for United States Letters Patent of Robert A. James and Cecil R. Ward, Serial No. 771,393, filed November 3, 1958, now U.S. Patent No. 3,097,942, granted July 16, 1963, entitled "Manufacture of Glass." In this application, instead of eliminating the flow of air to the base of the sheet, as disclosed by the aforesaid Brichard, the flow of air to and from the base of the sheet is controlled or regulated, so as to be diminished but not eliminated, and thus the flow of air along the sheet in the direction of the draw is reduced but not eliminated. The flow of air in the direction of the draw forms an undisrupted unidirectional protective layer or envelope surrounding the sheet and moving at a velocity sufficiently low so that it does not disturb the relatively thin insulating surface adhering film of air surrounding the sheet, with a material reduction in attenuation variations, thus providing an improvement in the appearance of the sheet.

The provision of a protective envelope of air moving at a sufficiently low velocity in the direction of the draw results in minimizing cooling of the glass sheet by heat transfer through convection currents and thereby allows more uniform cooling of the sheet by radiation to the usual coolers spaced from the sheet and located slightly above the surface of the bath. The end-around currents are also reduced and/or rendered ineffective, so that the usual diagonal wave pattern is eliminated.

The various arrangements disclosed and claimed in the aforesaid James and Ward application for improving the appearance of drawn sheet glass include the use of means that serve as barriers, diverters, or isolaters, or various combinations of these means so located and positioned within a drawing chamber or supported adjacent to components defining the chamber as to reduce the flow, i.e., quantity and velocity, of air to and from the base of a glass sheet as it is being drawn and to control the flow along the sheet to minimize non-uniformities in heat transfer from the sheet along its path of movement in the kiln.

The various arrangements disclosed and claimed in the aforesaid James and Ward application successfully accomplish their desired purpose, i.e., producing drawn sheet glass of improved appearance. However, the use of such arrangements results in a drawing speed loss as compared with glass produced using a usual kiln arrangement, thus resulting in a higher production cost per unit quantity of glass so produced.

A major portion of the speed loss resulting from the use of the various pattern improvement arrangements described in the aforesaid James and Ward application can be recaptured without material change in pattern improvement by using the teachings of this invention wherein it is proposed to modify the structure of one of the pattern improvement elements.

Therefore, the primary objects of this invention is the provision of apparatus for producing improved appearance sheet glass with a recapturing of a major portion of the drawing speed loss attendant to the use of pattern improvement arrangements.

Other objects and features of this invention will be apparent from the following description and the appended drawings, which illustrate various embodiments of the invention and in which:

FIG. 2 shows diagrammatically a preferred embodiment of a drawing kiln according to this invention and the flow of principal air currents therein;

FIG. 3 is a perspective view of a preferred embodiment of the apparatus of this invention incorporated in the drawing kiln arrangement shown in FIG. 2;

FIG. 4 is a view taken on line 4—4 of FIG. 3;

FIG. 6 is a perspective view of the second embodiment form of apparatus incorporated in the drawing kiln arrangement shown in FIG. 5; and FIG. 7 is a view taken on line 7—7 of FIG. 6.

Figure 1:
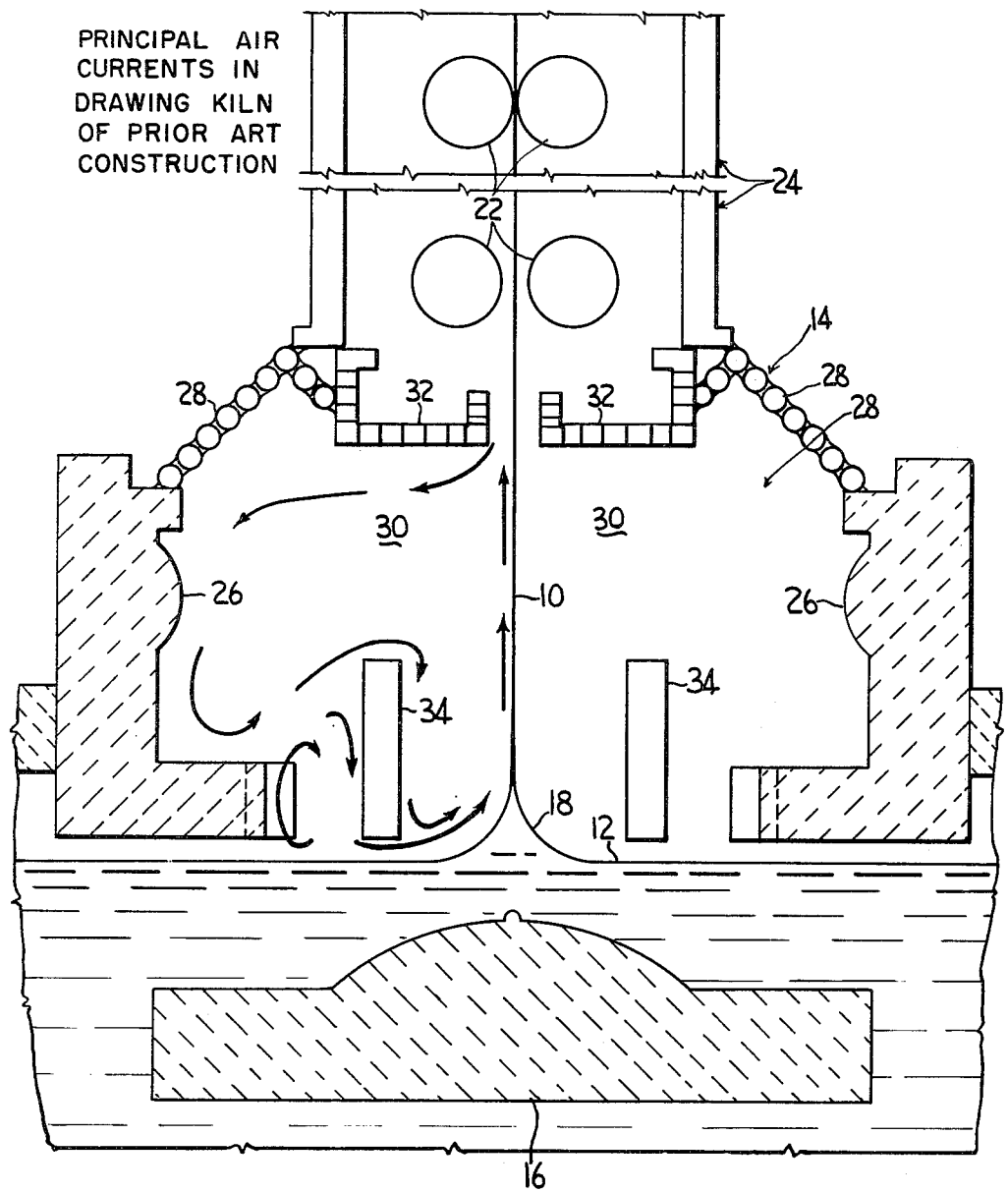
FIG. 1 shows diagrammatically a drawing kiln of conventional, prior art construction and the flow of principal air currents therein.
Figure 5:
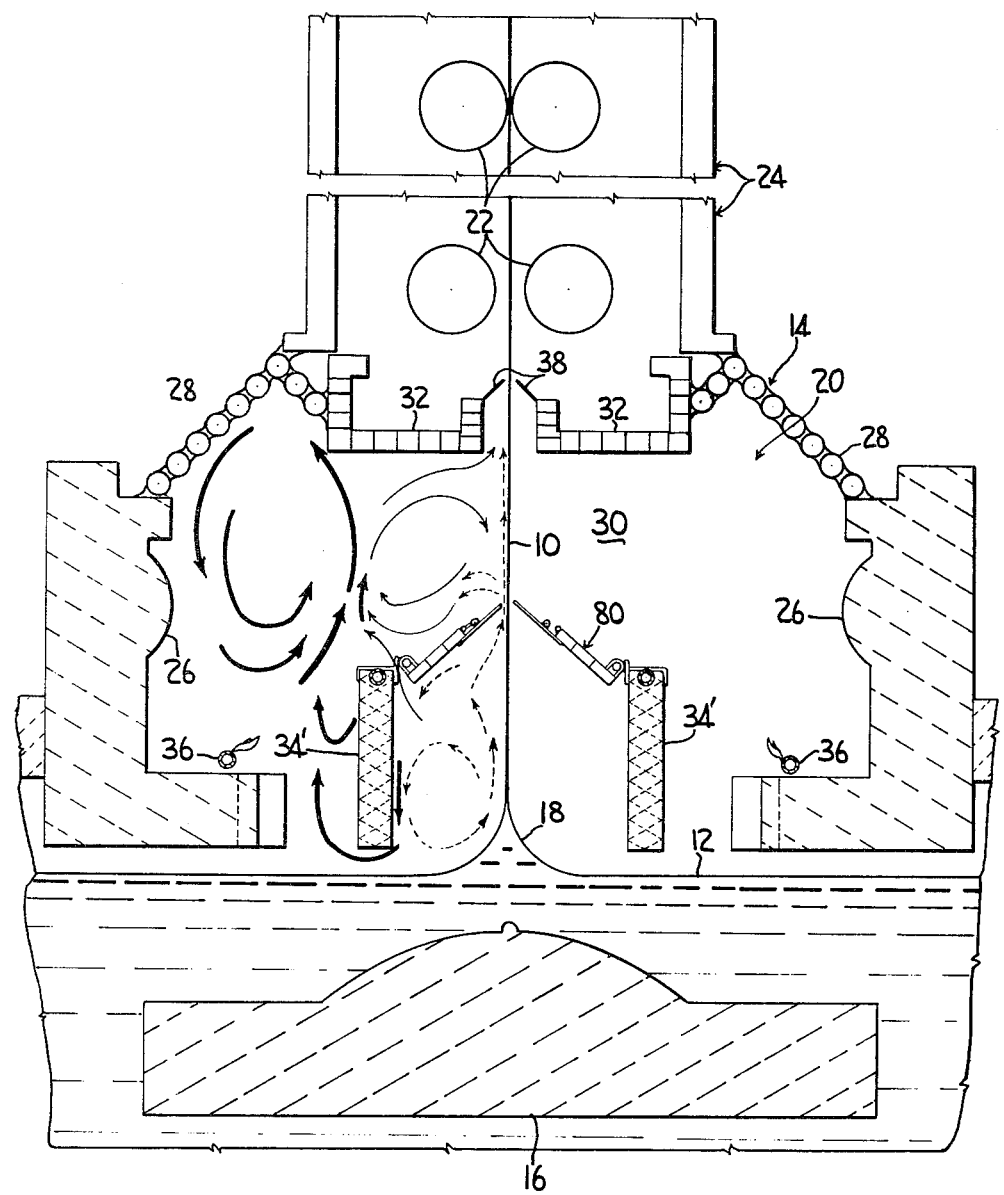
FIG. 5 shows diagrammatically a second embodiment of this invention and the flow of principal air currents therein.

Turning to the drawings wherein like parts are identified with like reference characters, there is shown in FIGS. 1, 2 and 5, a sheet of glass 10 being drawn through an upwardly extending plane from a bath 12 of molten glass in a drawing kiln generally indicated at 14 (only parts of which are shown but which is a conventional construction). A draw bar 16 extending transversely of the kiln 14 is submerged in bath 12. The glass sheet 10 in its viscous condition forms a base or meniscus 18 with the surface of the bath 12, and the sheet 10 is drawn from the bath 12 and through the drawing chamber 20 of the kiln 14 by means of drawing rolls 22 of a conventional drawing machine generally indicated at 24. The drawing chamber 20, as depicted in the drawings, is defined by bath 12 and conventional L-blocks 26, ventilator water coolers 28, end walls 30 and catch pans 32. The ventilator coolers 28 are each positioned between a refractory L-block member 26 and the base framework of the drawing machine 24 and extend substantially to the end walls 30 of the kiln 14. The base of the drawing machine 24 is substantially closed by means of the generally U-shaped catch pans 32, which are formed as coolers and are positioned so as to catch broken glass which may drop in the machine and thus prevent entry of fragments into the bath 12. These catch pans 32 also extend substantially to the end walls 30 of the kiln 14 and are constructed for the passage of cooling fluid, such as water. One leg of each catch pan 32 is disposed substantially parallel to and spaced from the sheet 10. Water coolers 34 (see FIG. 1) or water coolers 34' of a construction described and claimed in copending applications for United States Letters Patents of Ceil R. Ward, Serial No. 807,915 and 828,836, filed April 21, 1959, and July 22, 1959, respectively, both entitled "Heat Exchange Apparatus" and both now abandoned are provided for cooling sheet 10 by absorbing radiation from the sheet 10. The coolers 34 or 34' are spaced above the surface of the bath and are positioned on opposite sides of the sheet 10 to extend substantially the width of the sheet.

So much of the apparatus as has been just described with the exception of the coolers 34' is common to the prior art and the instant invention and constitutes a normal or usual sheet glass drawing apparatus set-up.

Reference is now made to FIG. 2 illustrating a preferred embodiment of this invention wherein, in addition to the conventional apparatus elements in their usual structural relationship, there are gas current injecting means comprising burners 36 and adjustable dampers 38 on each side of sheet 10 and disposed between the catch pans 32 and the first pair of rolls 22 of the drawing machine 24. Dampers 38 extend substantially the width of drawing machine 24. The burners 36 extend transversely of the chamber 20 for at least the width of the sheet 10 which lies in the plane of the draw. In addition to the burners 36 and the dampers 38, which are the same as described in the James and Ward application, there are adjustable baffle members 40 positioned between and preferably spaced from the sheet 10 and the coolers 34 or 34'. These baffle members 40 are constructed of an imperforate fluid cooled portion 42 and an imperforate heat resistant portion 44 and form the subject of this invention, replacing the solid heat resistant baffle plates described and claimed in the James and Ward application. The burners 36 are also located in the drawing chamber between each cooler 34 and refractory L-block member 26 on each side of the plane of the draw of the sheet 10 as is shown in both FIGURES 2 and 5 of the drawings.

The burners 36 are pipes, each having closely spaced holes through which combustible fluid can escape, preferably normal to the longitudinal axis of pipe 36. Upon combustion the gaseous products form a substantially continuous sheet of heated gases extending across the chamber 20. The burners 36 are illustrated as having their flames directed upwardly at an inclined angle toward sheet 10. The burners 36 are so constructed as to be rotatable to vary the inclined angle of the flames. The dampers 38 are constructed so as to be adjustable to vary their angular disposition and their upward disposition and by adjustment can be spaced from or wipe against the rolls 18. The baffle members 40 are constructed for rotation about the edge adjacent the coolers 34 or 34' and are illustrated as being inclined upwardly from the top of the coolers 34' toward sheet 10.

Looking now at FIGS. 3 and 4, there are illustrated constructional details of the improved baffle members 40. As is noted, there is a water cooled portion 42 constructed of joined side-by-side hollow elements 46, illustrated as being of rectangular cross-section, suitably joined to a manifold 48 for the passage of a cooling fluid, preferably water. Cooling fluid inlet and outlet pipes 50 are connected to the opposite ends of the assembly of hollow elements 46 and manifold 48. These pipes 50 pass through openings in the end walls 30 and also function as a means for angularly adjusting the baffle members 40 to their desirable angular position. The heat resistant portion 44 of the baffle member 40 is a flat metal plate 52 having a continuously flanged edge 54. Connecting means 56 in the form of relatively short lengths of metal tubing 58 connected at spaced intervals along and adjacent the flanged edge 54 and metal rods 60 of the shape illustrated and connected at the same spaced intervals along the portion 40 are employed for joining the portions 42 and 40. This connection in which each rod 60 is receivable within a corresponding tube 58 is such that the portions 42 and 44 are easily connected and disconnected and, also, allows angular adjustment of the portions relative to one another. One of the important features of the construction being described is the spacing 62 between the fluid cooled portion 42 and the solid portion 44 of the baffle member 40. This space 62 substantially thermally isolates one portion from the other portion and substantially eliminates heat transfer between the two portions. However, a free or uncovered space would destroy the effects of the baffle member because it would then not limit the air flowing into or out of the zone between the baffle, the sheet, the bath and the adjacent cooler. In other words the degree of isolation would be very materially reduced, which is not desirable. An imperforate member 64 of an insulating material capable of withstanding the relatively high kiln heat, such as asbestos, is provided to bridge the space 62, the member 64 being coextensive in length with the baffle member 40. One edge of the member 64 is attached, as by riveting or other fastening means, to each of the portions 42 and 44. Thus, the portions 42 and 44 are effectively thermally isolated from one another and the space 62 is effectively closed.

Suitable brackets 66 (see FIG. 2) engage the tops of the coolers 34', each bracket terminating adjacent the baffle member 40 in a U-shaped portion 68 to which is fixedly connected a tubular member 70. A U-shaped bracket 72 fixedly connected to the baffle member 40 fixedly surrounds the free area of each tubular member 70 to thereby form hinge joints, so that the baffle members 40 may be angularly adjusted for optimum positioning. The brackets 66 may be of various lengths depending on the spacing or lack of spacing desired between the member 40 and the cooler 34.

Reference is now made to FIG. 5 illustrating a second embodiment of this invention which differs from the embodiment illustrated in FIG. 2 in the construction of the baffle assembly, identified in FIG. 5 with the reference character 80. The major difference between the baffle assembly 40 (FIG. 2) and the baffle assembly 80 is that there is no spacing between the cooled portion 82 and the solid, heat resistant portion 84.

Looking now at FIGS. 6 and 7, there are illustrated constructional details of the baffle assembly 80. As is noted, there is an imperforate water cooled portion 82 constructed of joined side-by-side hollow elements 86, illustrated as being of rectangular cross-section, suitably joined to a manifold 88 for the passage of a cooling fluid, preferably water. Cooling fluid inlet and outlet pipes 90 are connected to the opposite ends of the assembly of hollow elements 86 and manifold 88. These pipes 90 pass through openings in the end walls 30 and also function as a means for angularly adjusting the baffle assemblies 80 to their desired angular position. The imperforate heat resistant portion 84 of the baffle assembly 80 is a flat metal plate 92 which overlies a portion of the cooled portion 82. Connecting means 94 in the form of relatively short lengths of metal tubing 96 connected at spaced intervals along the plate 92 and inboard from the overlying portion thereof and U-shaped metal rods 98 having one leg connected to the cooled portion 82 and the other leg received within the tubing 96 are employed for connecting the portions 82 and 84 together.

Suitable brackets 100 are each connected to a short tubular element 102 slidably receivable within U-shaped straps 104 which are in turn connected to the portion 82 provide a hinge joint for allowing angular adjustment of the baffle assembly 80. Each bracket 100 is adapted to fit over the top of a cooler 34' to position the assembly 80 within the kiln 14. In the event that a cooler, such as 34 is employed, the bracket 100 will require modification as will be apparent to one skilled in the art.

In FIGS. 1, 2 and 5, inclusive, of the drawings, the directions of the principal air currents within the drawing chamber 20 are shown by arrows for the left-hand portion of chamber 20. It is not necessary to show the principal air currents to the right of sheet 10 because they are mirror images of those shown. Relatively high, intermediate, and relatively low velocity air currents are shown in heavy solid, light solid, and broken lines, respectively. In FIG. 1 the principal air currents for the normal drawing kiln arrangement are illustrated.

The temperature of glass sheet 10 in its travel through chamber 20 is substantially above the general air temperature within chamber 20, so that sheet 10 induces air to flow in the direction of its draw and along its faces. This air flow creates low pressure zones in the vicinity of each side of the base 18 of sheet 10. The currents of air along the faces of the sheet are those which form the natural stack effect. This layer of air along the sheet moves at a substantially greater velocity than the sheet. To supply this stack flow of air there must be a supply of air flowing to the low pressure zones. A primary source of this air is the drawing machine. That air enters chamber 20 between sheet 10 and catch pans 32 at a temperature below that of sheet 10 and flows past the catch pans 32, which are constructed as coolers, the ventilator coolers 28 and the L-blocks 26 between the end walls 30, all at relatively low temperatures, so that a zone on each side of sheet 10 and generally bounded by catch pan cooler 32, ventilator cooler 28, L-block 26 and walls 30 become a secondary source of colder air. The temperature in this secondary zone will vary transversely thereof, being lower adjacent the end walls 30, so that air in different portions in this zone will also vary in temperature. Air from this zone flows to the low pressure zone at the base 18 on each side of sheet 10. The colder air from the secondary source flows downwardly and across the faces of coolers 34, being further chilled, and into the low pressure zone at the base of sheet 10, thereby providing a relatively large quantity of colder air, and, more importantly, moving at relatively high velocities of different magnitudes to the low pressure zones. This colder air of different temperatures and velocities transversely of chamber 20 disturbs non-uniformly the air traveling with the sheet, resulting in the formation of the usual characteristic longitudinal wave pattern extending in the direction of the draw. End-around currents of colder air also flow to the low pressure zones at the base 18 of sheet 10 and disturb the air flowing with the sheet in the direction of the draw, thus resulting in the diagonal wave pattern.

The kiln arrangement depicted in FIGS. 2 and 5 include the use of means which act as barriers, diverters, and isolaters and these are so located and positioned in the drawing kiln to reduce the flow, i.e., quantity and velocity, of air to the base of a glass sheet as it is being drawn, thereby eliminating or materially reducing the intensity of the usual characteristic wave pattern. For purposes of later description, a barrier is a physical obstruction placed in a flow stream thereby reducing its velocity; a diverter is a device which changes the direction of flow of a fluid; and, an isolater is that which reduces or eliminates the quantity of fluid flowing into and/or out of a zone. The various pattern improvement devices employed in the kiln arrangements depicted in FIGS. 2 and 5 primarily perform one of the described functions.

Looking at FIGS. 2 and 5, the kiln arrangements include gas injecting means or burners 36, dampers 38 and the baffle assemblies of this invention. The entry of air from a primary source, i.e., the drawing machine 24, is effectively pevented or materially reduced by dampers 38, so that the quantity of relatively colder air moving to chamber 20 is materially reduced, and it follows that the quantity of air moving out of chamber 20 is also materially reduced. Thus, the velocity of air moving out of chamber 20 is lowered.

The burners 36 shown as having their flames angularly directed away from the L-blocks 26 alter or divert the path of movement of air in the zone of the secondary source of air, giving a cyclic path to this air. The burners 36 also create zones of low pressure adjacent their locations, so that air from the vicinity of the coolers 34' is diverted into the cyclic path of the air in the zone of the secondary source. Thus, the direction of flow across the coolers 34' is altered. This altering and diversion of air by burners 36 reduces the quantity of air flowing to the base of the sheet 10. As a result the velocity of the layer of air moving in the direction of the draw from the base 18 is lessened.

The baffle assemblies 40 or 80 reduce the quantity of air flowing out of the low pressure zones at the base of the sheet, i.e., in the direction of the draw, and thus serve to further reduce the velocity of this air flowing in the direction of the draw. Because of this reduction in the quantity of air flowing from the zones at the base of the sheet, the quantity of air flowing into these zones is also further reduced.

With reduced flow of air in the direction of the draw, the effects of its non-uniformity in velocities and temperatures are diminished, leading to the elimination of the disturbance of the relatively thin surface film or air adjacent the sheet and the elimination or material reduction in the intensity of the wave pattern of the sheet.

The baffle assemblies 40 or 80, when spaced from the coolers 34 or 34' also provide an auxiliary stack effect whereby air between coolers 34 or 34' and the established protective envelope of air moving in the direction of the draw is diverted and is carried into cyclic paths in the zone of the secondary source. The end-around currents are pulled into this stack, so as to be rendered ineffective to cause a diagonal wave pattern on the sheet. The auxiliary stack effect also inhibits the occurrence of undesirable cyclic currents of air in the low pressure zone adjacent the base 18 of the sheet 10.

Thus, the catch pan dampers 38 primarily serve as barriers; the burners 36 primarily serve as diverters; and the baffle assemblies 40 and 80 primarily serve as isolaters. Each of these devices provide the other functions to a lesser degree as set forth in the James and Ward application.

The baffle assemblies 40 and 80 of this invention also function to increase the speed of draw of the glass sheet over that obtained by using solid plate baffles with no provision for internally cooling a portion thereof, as taught in the aforesaid James and Ward application. Solid metal plates, as taught in that application re-radiate heat to the bath and the sheet, the direction of re-radiation being substantially normal to the plane of the baffle. The viscosity of the sheet adjacent its zone of formation is lowered and the rate of change from fluid to solid state occurs more slowly than usual, so that the drawing speed must be reduced from that normally encountered to maintain the draw of the sheet.

Cooling of the baffle assembly, as proposed in this invention materially reduces if not eliminates the re-radiation of heat energy to the bath of molten glass and the sheet adjacent the base so that the temperature of the bath and the sheet in its area of formation are not heated to abnormal temperatures, thus the major portion of the loss in drawing speed encountered by the use of pattern improvement devices may be recaptured. The recapturing of a major portion of the speed loss attendant to the use of pattern improvement equipment in the form of isolaters however has no material effect on the pattern improvement in the glass sheet produced by the device.

In addition, it may readily be understood that a high viscosity sheet makes the operation of the drawing apparatus more normal, characterized by normal drawing speeds and thus the operation is more stable, with less likelihood of losing the sheet.

Of course, it is only possible to obtain the described results with the portion adjacent the coolers being water cooled. Cooling of the entire baffle would introduce a cooled edge closely adjacent the sheet with the result that severe temperature changes would disrupt the film of air traveling with the sheet in the direction of the draw and induce undulations in the sheet at this area.

Experience has shown that each and every sheet glass drawing kiln differs somewhat in operation, probably due to minor differences in dimensions, location of cracks, crevices or the like, location relative to the glass melting tank, etc. Therefore, the exact placement and settings of burners, dampers, baffle assemblies, etc., to give a particular result requires merely individual adjustment and positioning for each drawing kiln. One manner in arriving at the correct adjustment and positioning is by observing the air currents within the chamber. This may be accomplished by placing a smoke producing agent at various locations in the chamber. This procedure also allows the observer to compare, generally, the relative velocities of the air currents.

In the kiln arrangements, the burners 36 and the dampers 38 are preferably of the construction described in the aforesaid James and Ward application and are positioned and adjusted in the manner so disclosed therein.

Satisfactory operation has been accomplished with baffle assemblies 40, as depicted in FIGS. 2, 3 and 4 of the drawings, spaced 1 inch from the coolers 34 or 34', inclined 40 degrees to the horizontal toward the sheet 10 and spaced ½ inch from the sheet. Satisfactory operation has been accomplished with baffle assemblies 80, as depicted in FIGS. 5, 6 and 7 of the drawings, spaced 1 inch from the coolers 34 or 34', inclined 30 degrees to the horizontal toward the sheet 10 and spaced ½ inch from the sheet.

It is also possible to satisfactorily operate the drawing kiln with baffle members 40 or 80 spaced from the coolers 34 or 34', and a spacing from 1½ inches to 2 inches is preferred. It is also possible to increase the spacing between the baffle 40 or 80 and the sheet 10 with a limit of ¾ inch spacing for good pattern improvement. Further spacing results in less pattern improvement because the baffle assembly does not function as efficiently as an isolater. Closer spacing of the baffle to the sheet 10 seriously affects the drawing operation and is not advisable.

For comparison, using the water cooled baffle arrangements of the instant invention, drawing speed losses of 6 to 8 percent have been obtained as compared with a set-up with no baffles regardless of the glass thickness. Using solid heat resistant baffles, the speed loss has been 15 to 20 percent as compared with a set-up with no baffles. Thus, there is a material recapturing of drawing speed loss using the arrangements disclosed and claimed herein.

It has been stated above that the appearance of a glass sheet is not materially impaired by the use of the present invention as a modification of pattern improvement arrangements suggested in the James and Ward application, and, the use of the present invention provides for a speed gain over that provided when the James and Ward arrangements are employed.

As to the appearance of the glass sheet drawn using the present invention compared with glass sheet drawn by using a conventional arrangement and arrangements disclosed by James and Ward, a below described test is used for pattern reading. In this test a white screen is placed 25 feet from a light source comprising a 1000-watt bulb in an apertured box. A random selected substantially full width sample of glass sheet is cut into 5 equal parts across its width and each sample part is placed between the box and the screen with the direction of the draw of the sheet being horizontal. Each sample part is first titled to determine the area having the most pronounced wave pattern. The same is then placed parallel to the screen and moved slowly toward the screen while providing a slight up and down motion until the most pronounced wave shadow disappears. The distance from the screen to the sample part at this point of disappearance measured in inches is referred to as the disappearance reading. Thus, disappearance readings are taken of the glass sheet at spaced intervals across its width.

The following tabulation sets forth the disappearance readings of samples of glass made using the kiln arrangement of FIG. 1, using the kiln arrangements of FIGS. 2 and 5, and, for comparison, using the kiln arrangement of the James and Ward application incorporating solid heat resistant baffles, burners and dampers. The average reading is an average of five readings and the high and low readings are the high and low readings, respectively, of five readings. High disappearance readings, such as 30 inches and above are indicative of glass of much improved appearance. However, because of the character of the described test, the resolution for such high readings is less precise than for lower readings. Therefore, readings of between 30 and 40 inches are given as 30+.

Each arrangement listed below includes a cooler such as 34 or 34', and unless specifically stated, the construction of such cooler will be as illustrated in FIG. 1.

| Arrangement | Disappearance Readings in Inches | | |
|---|---|---|---|
| | Average | High | Low |
| 1. Prior Art (Fig. 1) | 8.4 | 12 | 6 |
| 2. Water Cooled Baffles 40, burners 36 (Fig. 2), dampers 38 | 27.2 | 30+ | 23 |
| 3. Baffles (not cooled), burners corresponding to burners 36, dampers corresponding to dampers 38 (James and Ward) | 28.0 | 30+ | 24 |
| 4. Water Cooled Baffles 40, dampers 38 | 12.5 | 18 | 9 |
| 5. Baffles (not cooled), dampers corresponding to dampers 38 (James and Ward) | 14.1 | 19 | 11 |

The drawing speed encountered in the manufacture of the sample of arrangement 2 above was approximately 14.3 percent above that encountered in the manufacture of the sample of arrangement 3. The drawing speed encountered in the manufacture of the sample of arrangement 4 was approximately 11.1 percent above that encountered in the manufacture of the sample of arrangement 5.

I claim:

1. In apparatus for drawing a sheet of glass in a substantially vertical plane from a bath of molten glass, and having a drawing chamber at least partially defined by refractory members supported on each side of the plane of draw of the glass sheet, the combination of a cooling member spaced above the bath substantially parallel to the sheet on each side of the plane of draw, a baffle assembly extending substantially the width of the glass sheet and within the chamber between each cooling member and the glass sheet, said baffle assembly having a hollow first portion mounted adajcent a cooling member and having a second portion adjacent and spaced from the glass sheet, means to supply a cooling fluid to such first portion of said baffle assembly, and gas current injecting means extending substantially the width of the plane of draw and located in said drawing chamber between each cooling member and said refractory members on each side of the plane of draw.

2. Apparatus as recited in claim 1, wherein said first portion and said second portion are substantially thermally isolated from each other.

3. Apparatus as recited in claim 2 wherein said first portion and said second portion are spaced from each other.

4. Apparatus as recited in claim 3, further including an imperforate thermal insulating member joined to both first and second portions and bridging the space therebetween, thereby preventing the passage of air therethrough.

5. Apparatus as recited in claim 1, wherein said first portion and said second portion are in contact with one another.

References Cited by the Examiner

UNITED STATES PATENTS

| 2,167,905 | 8/1939 | Pederson et al. | 154—57 |
| 2,353,539 | 6/1944 | Halbach et al. | 65—84 |

FOREIGN PATENTS

| 768,741 | 2/1957 | Great Britain. |

DONALL H. SYLVESTER, *Primary Examiner.*